United States Patent
Fontenot et al.

(10) Patent No.: US 10,042,775 B2
(45) Date of Patent: *Aug. 7, 2018

(54) VIRTUAL DISK ALIGNMENT ACCESS

(71) Applicant: International Business Machines Corporation, Armonk, NY (US)

(72) Inventors: Nathan D. Fontenot, Georgetown, TX (US); Robert C. Jennings, Jr., Austin, TX (US); Joel H. Schopp, Austin, TX (US); Michael T. Strosaker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 15 days.

This patent is subject to a terminal disclaimer.

(21) Appl. No.: 14/829,134

(22) Filed: Aug. 18, 2015

(65) Prior Publication Data

US 2016/0210242 A1    Jul. 21, 2016

Related U.S. Application Data

(63) Continuation of application No. 14/598,872, filed on Jan. 16, 2015.

(51) Int. Cl.
*G06F 12/10* (2016.01)
*G06F 12/1036* (2016.01)

(52) U.S. Cl.
CPC .......... *G06F 12/10* (2013.01); *G06F 12/1036* (2013.01); *G06F 2212/152* (2013.01); *G06F 2212/657* (2013.01)

(58) Field of Classification Search
CPC ...... G06F 21/80; G06F 3/0622; G06F 3/0631; G06F 9/4435; G06F 11/203; G06F 12/109; G06F 2212/656; G06F 9/465; G06F 12/10; G06F 12/1036; G06F 2212/152; G06F 2212/657

See application file for complete search history.

(56) References Cited

U.S. PATENT DOCUMENTS 8,578,126 B1    11/2013  Gaonkar et al.
8,694,713 B2 *  4/2014  Ginzton ............. G06F 9/45533
                                                711/202
8,793,465 B1    7/2014  Forgette et al.
(Continued)

OTHER PUBLICATIONS

List of IBM Patents or Applications Treated as Related, Aug. 2015.

*Primary Examiner* — Zhuo Li
(74) *Attorney, Agent, or Firm* — Lieberman & Brandsdorfer, LLC

(57) ABSTRACT

Embodiments relate to a virtualized storage environment with one or more virtual machines operating on a host and sharing host resources. Each virtual machine has a virtual disk in communication with a persistent storage device. The virtual machine(s) may be misaligned with the persistent storage device so that a virtual block address does not correspond with a persistent storage block address. A relationship between the virtual disk(s) and the persistent storage device is established, and more specifically, an alignment delta between the devices is established. The delta is employed to translate the virtual address to the persistent address so that the virtual and persistent storage blocks are aligned to satisfy a read or write operation.

12 Claims, 7 Drawing Sheets

(56) References Cited

U.S. PATENT DOCUMENTS

| | | | |
|---|---|---|---|
| 8,819,383 B1 | 8/2014 | Jobanputra et al. | |
| 8,954,665 B2* | 2/2015 | Czezatke | G06F 11/1451 |
| | | | 711/100 |
| 2009/0172286 A1* | 7/2009 | Lasser | G06F 12/0804 |
| | | | 711/127 |
| 2009/0271562 A1* | 10/2009 | Sinclair | G06F 12/0246 |
| | | | 711/103 |
| 2010/0257309 A1* | 10/2010 | Barsky | G06F 12/0246 |
| | | | 711/103 |
| 2011/0047347 A1* | 2/2011 | Li | G06F 12/0246 |
| | | | 711/209 |
| 2013/0198738 A1* | 8/2013 | Reddin | G06F 9/45558 |
| | | | 718/1 |
| 2014/0108759 A1* | 4/2014 | Iwamitsu | G06F 3/0604 |
| | | | 711/165 |
| 2014/0282514 A1* | 9/2014 | Carson | G06F 9/45533 |
| | | | 718/1 |

* cited by examiner

VIRTUAL DISK ALIGNMENT ACCESS

CROSS REFERENCE TO RELATED APPLICATION(S)

This application is a continuation patent application claiming the benefit of the filing date of U.S. patent application Ser. No. 14/598,872 filed on Jan. 16, 2015 and titled "Virtual Disk Alignment Access" now pending, which is hereby incorporated by reference.

BACKGROUND

The present embodiments relate to a virtualized storage environment. More specifically, the embodiments relate to alignment of a virtual disk storage device with an underlying persistent data storage device.

A virtualized machine environment commonly employs a virtual machine manager to allow multiple operating system images to share a single hardware host. In one embodiment, each operating system image is referred to as a virtual machine. Each operating system image appears to have sole access to the processor and memory of the host machine. However, the virtual machine manager actually controls the processor, memory, and resources of the host machine by allocating such resources to one or more of the virtual machines in a manner that minimizes processing disruptions.

A virtual hard disk is a disk image file format for storing content. More specifically, the virtual disk replicates an existing hard drive and includes all data and structural elements. An operating system running in the virtual machine may perform read, modify, and write operations on one or more virtual storage blocks, which accesses an underlying persistent device and the associated persistent storage blocks.

SUMMARY

The embodiments include a method for optimizing the layout of a virtual storage device.

The method provides for virtual block disk alignment. The alignment establishes a relationship between a virtual disk associated with a virtual machine and a persistent storage device. This alignment addresses a delta between the data blocks of the virtual disk and the block address(es) identified in the persistent storage device, so that a single read or write operation does not result in multiple disk accesses. A read or write operation is initiated, and a virtual disk block associated with the operation is dynamically relocated. More specifically, the alignment delta is used as a translation mechanism between the virtual disk block and the persistent storage device. The read or write operation is completed with the translated block alignment between the virtual and persistent storage devices.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

The advantages and benefits are further explained in the detailed description of the method, computer program product, and system described herein below.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Persistent storage devices are known to store data in units referred to as storage blocks, which is a sequence of bits or bytes having a defined length. It is understood that a virtual machine data block, also referred to as a virtual block, may straddle multiple persistent storage blocks, also referred to as physical blocks. More specifically, the virtual block may not align with the physical block. In one embodiment, this non-alignment may occur when a partition starting offset in a virtual machine is not divisible by the block size of the host. This causes a virtual block to span parts of two physical blocks, and a single read operation in the virtual machine to translate into two or more read operations in the physical storage device.

Figure 1:
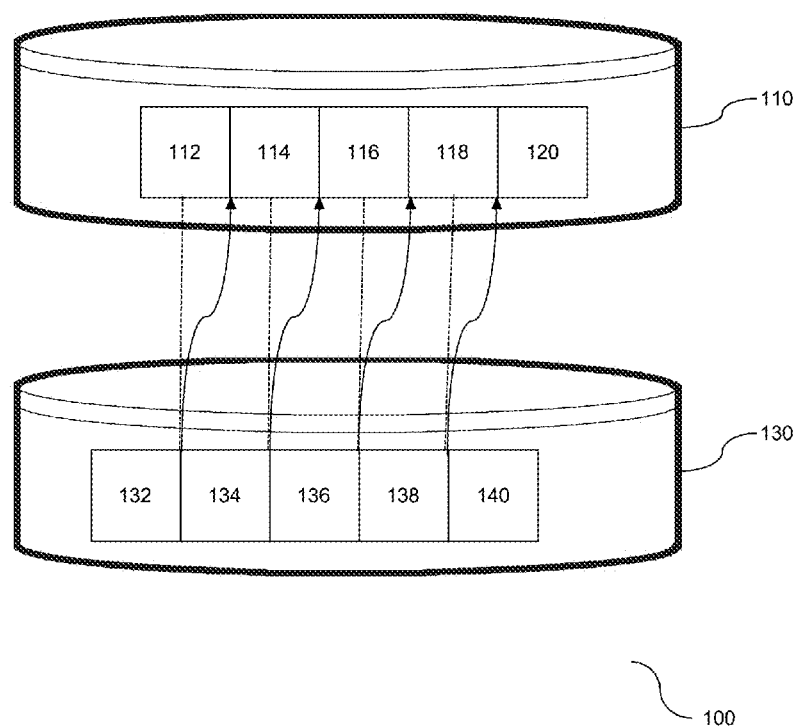
FIG. 1 depicts a block diagram illustrating an example alignment of virtual data blocks with persistent data blocks.

With reference to FIG. 1, a block diagram (100) is provided illustrating an example alignment of virtual data blocks with persistent data blocks. More specifically, a block arrangement of a persistent storage device (110) is shown with a plurality of persistent data storage blocks (112)-(120). Similarly, a block arrangement of a virtual storage device (130) is shown with a plurality of virtual data storage blocks (132)-(140). As shown, the virtual data blocks are not aligned with the persistent data storage blocks. In one embodiment, the virtual data storage blocks are a different size than the persistent storage blocks. Similarly, in one embodiment, the virtual storage blocks have a different starting position than the persistent data storage blocks. As a result of the non-alignment, a single read or write operation initiated by the virtual machine may actually require two or more read or write operations on the associated physical machine and persistent storage device(s).

Figure 2:
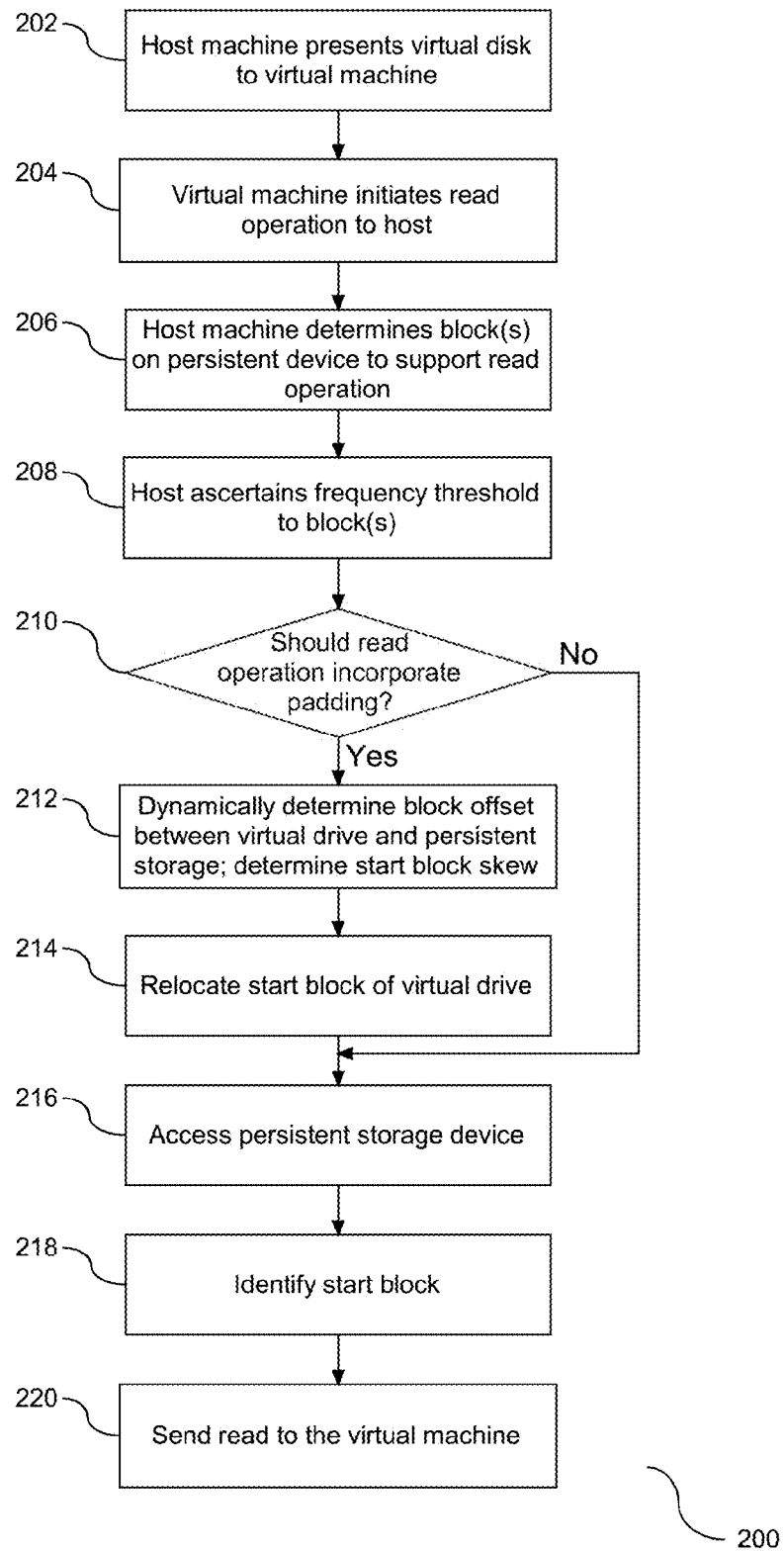
FIG. 2 depicts a flow chart illustrating a process for ameliorating a read operation in a virtual environment.

One solution to mitigate inefficiencies resulting from the non-alignment is to translate or provide a block translation between the virtual machine and the host machine. With reference to FIG. 2, a flow chart (200) is provided illustrating a process for ameliorating a read operation in a virtual environment. As shown, a host machine presents a virtual disk to a virtual machine operating in an associated virtualized environment (202). The virtual machine supports read and write operations to the virtual disk, which communicates with one or more underlying physical storage devices. A read operation initiated by the virtual machine, also referred to herein as a virtual read operation, initiates a read operation to the host machine (204). More specifically, the read operation from the virtual machine accesses the persistent storage device managed by the host machine. Following the initiation of the read operation at step (204), the host machine determines one or more blocks on the persistent storage device to support the read operation (206). In one embodiment, the determination at step (206) is a translation of the virtual data blocks to the persistent data blocks, also referred to herein as padding. Accordingly, for each read operation, a translation between the virtual storage device and the persistent storage device is ascertained.

In addition to the padding, the host machine ascertains the frequency threshold for the determined one or more blocks (208). Details of the frequency threshold are shown and described in FIG. 3. There is a cost associated with translating alignment of data blocks in support of the read operation. Following step (208), it is determined if the read operation should incorporate the padding (210). In one embodiment, there is a relationship between the frequency in which data blocks are employed to support the read operation and the cost of the padding, also referred to herein as the cost of the alignment based on the skew between the virtual and persistent devices. If at step (210) it is ascertained that the cost of the padding is acceptable, the block offset between the virtual drive and the persistent storage device is dynamically determined (212). The offset determination at step (212) includes determining the start block skew, e.g. the starting block on the persistent storage device that corresponds with the starting block on the virtual drive. In addition, the starting block of the virtual drive is relocated so that the virtual drive data block aligns with the persistent drive data block (214). In one embodiment, the relocation includes using the padding, also referred to herein as an alignment delta, as a translation between the blocks of the virtual and persistent devices. Following the relocation at step (214) or a negative response to the determination at step (210), the persistent storage device is accessed (216), the start block for the read operation is identified (218), and the data blocks in support of the read operation are sent to the virtual machine (220). Accordingly, the read operation that emanates from the virtual machine image is supported by one or more data blocks on the persistent storage device identified to support the content of the operation.

The process shown and described in FIG. 2 pertains to a read operation in which a data block or a range of data blocks provide data from a persistent storage device to complete the associated operation. It is understood that the virtual machine may read data from storage or write data to storage. The process shown in FIG. 2 may be extrapolated to address a write transaction in which data is written to persistent storage to complete the write operation. More specifically, each write operation has an identified starting block which receives the write data, and in one embodiment employs additional adjacently positioned block to complete the storage of data.

As shown in FIG. 2, there is a cost associated with padding the read operation. Namely, the cost includes the assessment of the skew between the virtual and persistent storage devices, and padding the transaction. It is understood that any host machines may include a plurality of virtual machines, each having a virtual drive in communication with a persistent storage device. One or more of the virtual machines may have a different skew. As such, the padding calculation for one virtual machine is not necessarily the same differential for another virtual machine.

Figure 3:
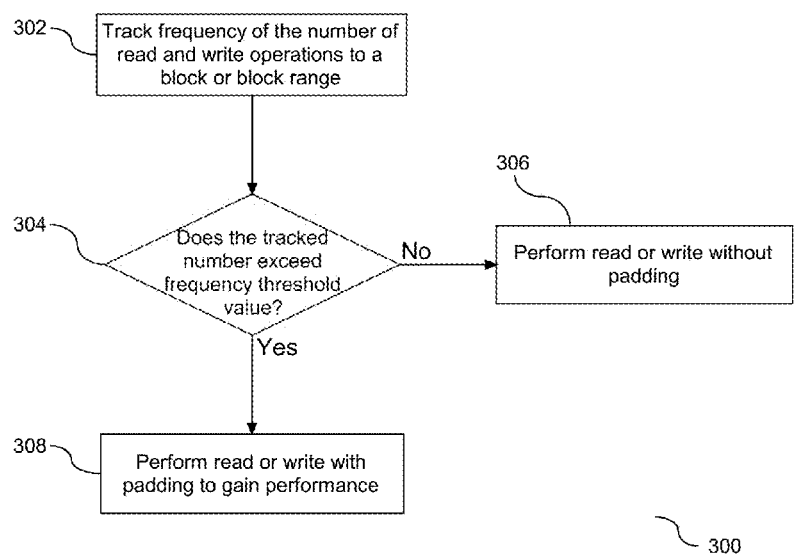
FIG. 3 depicts a flow chart illustrating a process for assessing the read operation and associated padding.

Referring to FIG. 3, a flow chart (300) is provided illustrating a process for assessing the read operation and associated padding. As shown, read and write operations are tracked (302). More specifically, the frequency of read and write operations to a specific block or block range is tracked. In one embodiment, each time a read or write transaction takes place to any block or block range, a counter is incremented for that specific byte or byte range. Since the frequency is tracked, for each operation it is determined if the tracked number of operations exceeds a threshold value (304). In one embodiment, the threshold value is a static value, and in one embodiment, the threshold value may be different for the different blocks or range of blocks. If the tracked number of operations does not exceed the threshold, then the read or write operation proceeds without padding (306). However, if the tracked number of operations does exceed the threshold, then the read or write operations proceeds with the padding (308). It is understood that use of the padding provides a performance gain, although at the expense of any costs associated with padding. Accordingly, prior to absorbing the costs of padding, it is first determined if there is a performance gain associated therewith based on frequency of block access.

Figure 4:
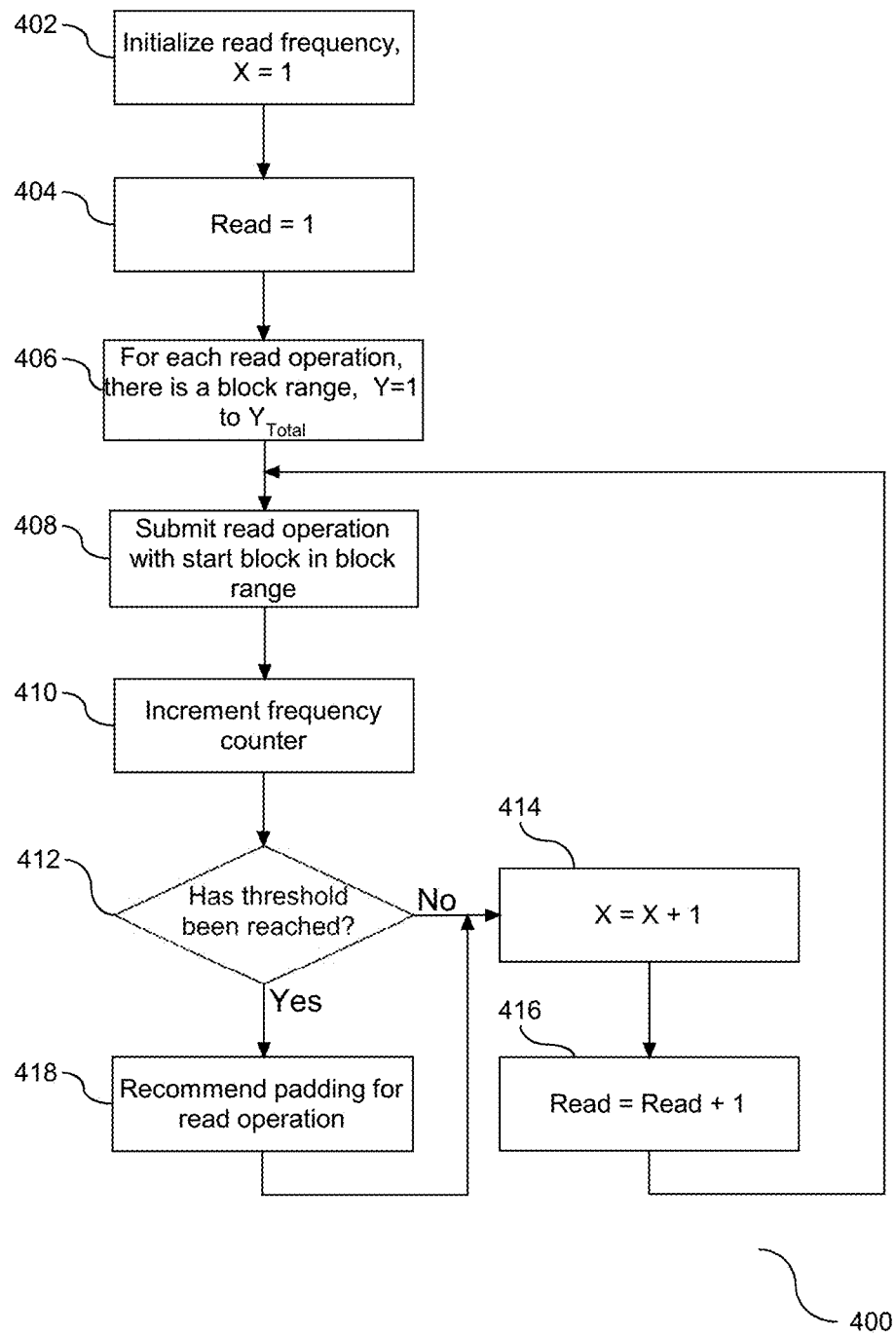
FIG. 4 depicts a flow chart illustrating details of frequency assessment.

As shown and described in FIG. 3, a frequency value is employed to ascertain the benefit of the padding in view of the cost. Referring to FIG. 4, a flow chart (400) is provided illustrating the details of frequency assessment. The process shown and described herein pertains to a read operation, but it is understood that it may equally apply to a write operation. As shown, the read frequency is initialized (402), and the operation counting variable is initialized (404). For each operation, there is an associated block range (406). Each time a read operation is processed the frequency is tracked and assessed. As shown, a read operation is submitted starting at a block within the range of blocks available (408). A frequency counter for the identified block or block range is incremented (410). It is then determined if the threshold has been attained based on the incremented frequency counter (412). A negative response to the determination at step (412) is followed by incrementing the read frequency variable (414) and the read operation counter (416), followed by a return to step (408). However, a positive response to the determination at step (412) is followed by recommending padding for the read operation to the identified block or block range (418). Regardless of the padding recommendation, the frequency continues to be assessed, as shown by a return to step (414) following the recommendation at step (418). Accordingly, the assessment shown and described herein illustrates one aspect of frequency evaluation.

In support of a read or write operation, herein referred to as an operation, the host machine can determine the skew between the virtual drive and the persistent storage device. The skew directly corresponds to the block padding between virtual and persistent storage devices. In one embodiment, the host machine makes the determination because it is the host that presents the virtual drive to the virtual machine, and as such, the host machine can see the misalignment and calculate the required padding.

Figure 5:
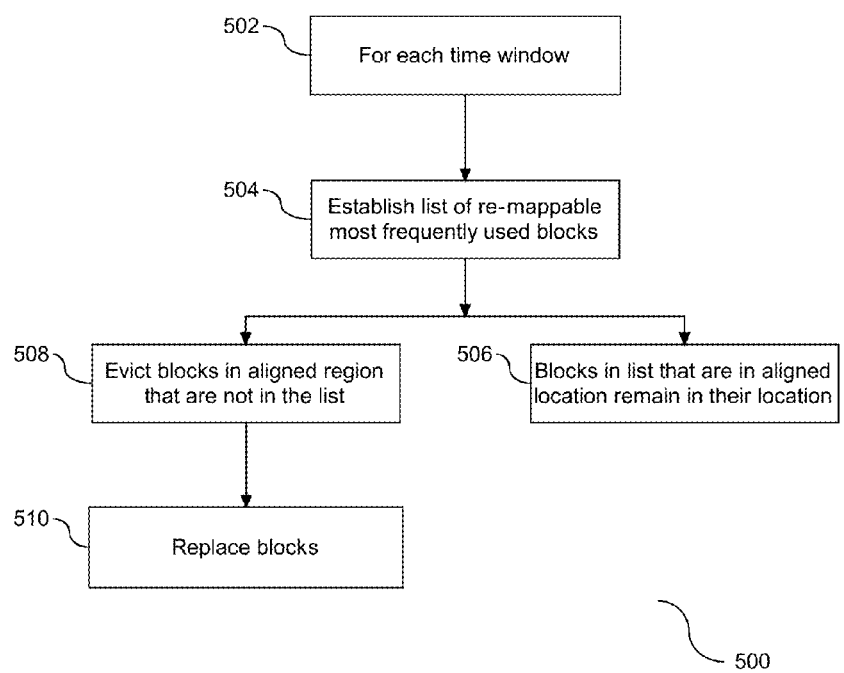
FIG. 5 depicts a flow chart illustrating a process for alignment based on frequently used blocks or range of blocks.

The padding algorithm, shown and described herein, counts blocks and block ranges that are a part of the operation. In one embodiment, the algorithm maintains a list of most frequently used blocks to assess the threshold. Referring to FIG. 5, a flow chart (500) is provided illustrating a process for alignment based on frequently used blocks or range of blocks. As shown, for each time window (502) a list of re-mappable most frequently used blocks is established (504). Read and write operations are tracked by the host over a window of time. The blocks in the list from step (504) that are in an aligned region remain in their location (506). However, the blocks in the aligned region that are not in the list are evicted to a non-aligned location (508) and replaced with blocks identified as most frequently used that were located in the non-aligned region (510). This process of replacing data block allows the system to respond to workload changes by providing faster access to currently relevant blocks. In one embodiment, where the quantity of re-mappable blocks equals the number of blocks used by the virtual machine, every block would eventually appear in the aligned region. By moving data blocks between aligned and non-aligned regions based on frequency of use, the cost associated with padding the operation is minimized. Accordingly, the process shown herein demonstrates a process of moving frequently accessed data blocks to aligned areas between the virtual and persistent drive to mitigate the cost associated with padding the operation.

Figure 6:
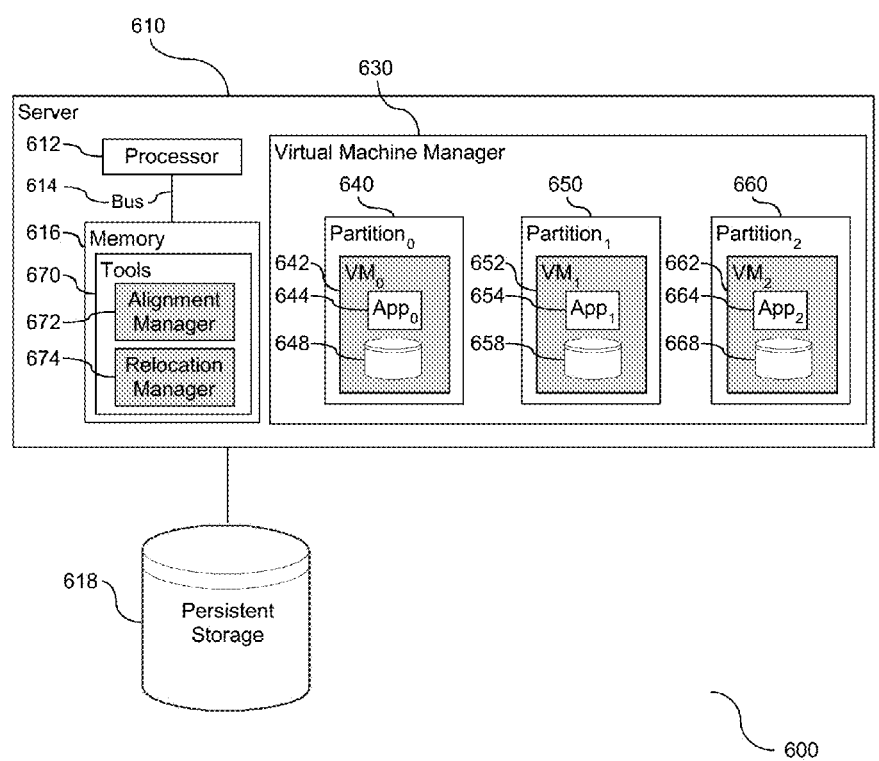
FIG. 6 is a block diagram illustrating components embedded in a computer system to support block alignments according to an embodiment.

Referring to FIG. 6, a block diagram (600) is provided illustrating components embedded in a computer system to support and enable alignment of virtual drive blocks with persistent storage device blocks. As shown, a server (610) is provided with a processing unit (612), also referred to herein as a processor, in communication with memory (616) across a bus (614), and in communication with persistent data storage (618). In one embodiment, the server (610) is also referred to as the host machine. Although only one storage device (618) is shown herein, in one embodiment, the server (610) is in communication with a plurality of persistent storage devices, and as such, device (618) is representative of persistent storage.

A virtual machine manager (630) is provided to operate in the host (610) and functions to create partitions and assign processor resources to each partition. As shown herein, there are three partitions (640), (650), and (660), although the quantity should not be considered limiting. Each partition functions as a virtual machine and includes a guest operating (642), (652), and (662), respectively. Similarly, each partitions may process one or more applications (644), (654), and (664), respectively, in the virtual environment. Each virtual machine has a virtual drive (648), (658), and (668), respectively, and each virtual drive is coupled to one or more persistent storage devices (618). Read and write operations that are processed by the respective virtual machine reads data from and write data to the persistent storage device (618) via the respective virtual drive.

As shown and described in FIGS. 1-5, there may be a misalignment between one or more of the virtual drives (648), (658), and (668), and the persistent storage device (618). A tool (670) is provided local to the host (610), and more specifically, in communication with the processor (612). The tool (670) functions to establish a relationship between one or more of the virtual drives (648), (658), and (668), and the persistent storage device (618). The tool (670) is shown with two components, including an alignment manager (672) and a relocation manager (674). Together, these tools function to assess the performance gain associated with re-alignment, and in one embodiment, to proceed with the re-alignment of the virtual drive to the persistent storage device.

The alignment manager (672) functions to assess an alignment delta, as shown and described in FIG. 1, of data blocks between one or more of the virtual drives (648), (658), and (668), and the persistent storage device (618). As discussed above, an alignment delta, also referred to herein as a misalignment between any one of the virtual drives and the persistent storage device, may result in a read or write operation requiring two or more requests to the persistent storage device (618) instead of a single request. Any misalignment is an indication of a skew between a virtual data block and a persistent data block. The alignment manager (672) determines a start block skew between the associated virtual drive and the persistent storage device (618). In one embodiment, the start block skew leads the virtual machine to the actual persistent start block in support of the read or write operation. The relocation manager (674) functions in conjunction with the alignment manager (672) to dynamically relocate a virtual disk block in response to receipt of a read or write operation so that the virtual disk block(s) aligns with the actual persistent storage device block. More specifically, the relocation manager (674) uses the skew, also referred to herein as an alignment delta, to translate alignment between the virtual and persistent storage blocks.

As discussed above, in theory the tools described herein may be employed for each read and write operation in order to mitigate the number of accesses to the persistent storage device (618). However, there is a cost associated with use of the tools, which in one embodiment may be greater than an increased number of accesses to the persistent storage device (618). In one embodiment, the alignment manager (672) functions to track the frequency of access to persistent data blocks, with the frequency of access having a direct or indirect relationship to cost mitigation. Data blocks that are more frequently access may benefit from the alignment. A threshold value may be set for a given time interval, with the alignment manager (672) tasked to track the frequency of block access within the interval. The threshold is employed as a line of demarcation, with the relocation manager (674) employing the block address translation for the request if the frequency meets or exceeds the threshold, and proceeding with the transaction without the translation if the frequency does not at least meet the threshold. Accordingly, the managers (672) and (674) function to mitigate translation between the virtual drive and the persistent storage device based on performance gain.

The server (610) described above in FIG. 6 has been labeled with tools in the form of an alignment manager (672) and a relocation manager (674). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects.

Figure 7:
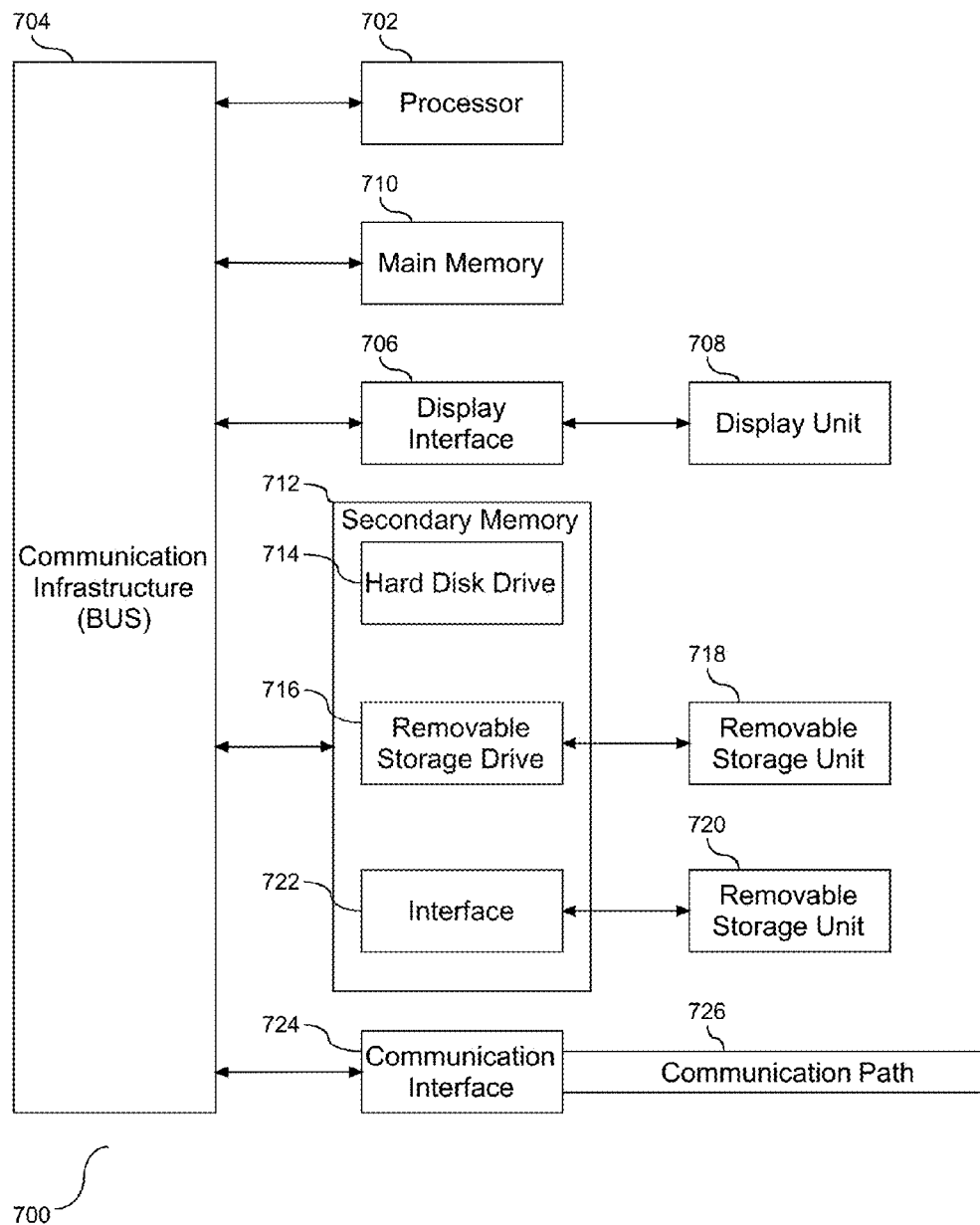
FIG. 7 is a block diagram of a computing environment according to an embodiment.

Referring now to the block diagram of FIG. 7, additional details are now described with respect to implementing one or more embodiments. The computer system includes one or more processors, such as a processor (702). The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716).

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present embodiment(s) as discussed herein. In particular, the computer programs, when run, enable the processor (702) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments, and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the form disclosed. Many modifications and variations will be apparent to those of ordinary skill in the art without departing from the scope and spirit. The embodiment was chosen and described in order to best explain the principles and the practical application, and to enable others of ordinary skill in the art to understand the various embodiments with various modifications as are suited to the particular use contemplated. As disclosed herein, a process and tools are employed to accommodate a misalignment between a virtual drive assigned to a virtual machine, and an underlying persistent storage device. Block addresses are translated between the virtual interface and the persistent storage device to mitigate multiple communications to satisfy a single transaction. Accordingly, the translation of addresses supports dynamic relocation of the virtual disk block so that it aligns with the block address of the persistent storage device.

It will be appreciated that, although specific embodiments have been described herein for purposes of illustration, various modifications may be made without departing from the spirit and scope of the invention. Accordingly, the scope of protection is limited only by the following claims and their equivalents.

We claim:

1. A method comprising:
    establishing a relationship between a virtual disk for a virtual machine and a persistent storage device, including an alignment delta of data blocks between the virtual disk and the persistent storage device, wherein a single request to the virtual disk produces two or more requests to the persistent storage device;

dynamically relocating a virtual disk block in response to an operation, including employing the alignment delta and translating alignment between the virtual disk block and a persistent storage device block;

tracking frequency of access to one or more data blocks, the access associated with the operation selected from the group consisting of: a read operation and a write operation, wherein the dynamic relocation is based on the tracked frequency; and completing the operation with the translated block alignment between the virtual disk block and the persistent device block.

2. The method of claim 1, wherein the dynamic relocation includes determining a start block skew between the virtual disk and the persistent storage device.

3. The method of claim 1, further comprising:

satisfying the request with the translation in response to the tracked frequency meeting or exceeding a threshold, wherein the satisfaction of the request with the translation delivers a performance gain by completing the request in a second single request to the persistent storage; and satisfy the request without the translation in response to the tracked frequency being below the threshold, including producing the two or more requests to the persistent storage device.

4. The method of claim 3, wherein each request is selected from the group consisting of: a read operation and a write operation.

5. The method of claim 1, further comprising maintaining an aligned region of the virtual disk and an unaligned region of the virtual disk, wherein a second single request to a select first data block in the unaligned region results in the two or more requests to the persistent storage device, wherein each request is selected from the group consisting of: a read operation and a write operation.

6. The method of claim 5, further comprising selectively replacing one or more first data blocks from the aligned region with one or more second data block from an unaligned region based on a change in workload to the corresponding blocks.

7. The method of claim 6, wherein the one or more second data blocks are present in the aligned region and absent from the unaligned region responsive to the replacement.

8. The method of claim 5, wherein a third single request to a select second data block in the aligned region results in a fourth single request to the persistent storage device.

9. The method of claim 5, wherein a first access to a third data block in the aligned region is faster than a second access to the third data block in the unaligned region.

10. The method of claim 1, wherein the tracked frequency of access includes a quantity of accesses.

11. The method of claim 1, further comprising minimizing a cost associated with the dynamic relocation based on the tracked frequency.

12. The method of claim 1, wherein the dynamic relocation of the virtual block occurs in the virtual machine.

* * * * *